United States Patent Office 3,483,254
Patented Dec. 9, 1969

3,483,254
2-BORNANEMETHYLAMINES
Tsung-Ying Shen, Westfield, and Bruce O. Linn, Plainfield, N.J., assignors to Merck & Co., Inc., Rahway, N.J., a corporation of New Jersey
No Drawing. Filed Jan. 3, 1967, Ser. No. 616,225
Int. Cl. C07c 85/00, 87/00
U.S. Cl. 260—563  18 Claims

ABSTRACT OF THE DISCLOSURE

This invention relates to 2-bornanealkylamines, for example, 2-boronanemethylamines, which are either unsubstituted or substituted at the amino nitrogen by an alkyl, alkenyl, hydroxyalkyl, alkylaminoalkyl, dialkylaminoalkyl, aryl or aralkyl radical. Also included are the salts, diastereoisomers and endo and exo forms of the said products.

---

Several preparative methods are disclosed; the basic process comprising the conversion of a 2-bornane lower alkyl ketone to its corresponding oxime followed by reduction of the said oxime to the desired 2-bornanemethylamine. The products are anti-viral agents having particular application against the influenza and flu viruses.

This invention relates to a new class of bornanemethylamines and to the nontoxic, pharmacologically acceptable salts thereof.

At present there are very few therapeutic agents available for the control of pulmonary infection due to the influenza virus. The antigenic constitution of that virus varies to such a degree that it is practically impossible to include all of the necessary strains in a single vaccine; therefore, influenza occurs even in vaccinated subjects. It is an object of this invention to describe a novel class of chemotherapeutic agents which are useful, in vivo, against viral respiratory diseases, particularly, against the influenza and flu viruses and, further to describe several dosage forms for the therapeutic administration of the instant products.

The products of this invention are compounds having the following general formula:

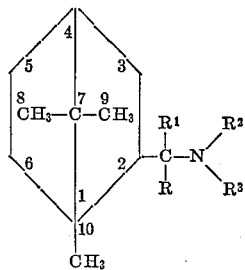

wherein R and $R^1$ are similar or dissimilar members selected from hydrogen and lower alkyl, for example, methyl, ethyl, propyl, isopropyl, butyl, isobutyl, amyl, etc.; $R^2$ and $R^3$ are similar or dissimilar members selected from hydrogen, alkyl, for example, lower alkyl such as methyl, ethyl, propyl, isopropyl, butyl, isobutyl, amyl, etc., lower alkenyl, for example, allyl, methallyl, etc., hydroxy substituted lower alkyl, for example, 2-hydroxyethyl, etc., lower alkylamino substituted lower alkyl, for example, methylaminomethyl, ethylaminomethyl, 2-methylaminoethyl, 2-ethylaminoethyl, 2-(n-propylamino)ethyl, etc., di-lower alkylamino substituted lower alkyl, for example, dimethylaminomethyl, diethylaminomethyl, 2-dimethylaminoethyl, 2-diethylaminoethyl, 3-diethylaminopropyl, etc., mononuclear aryl, for example, phenyl, mononuclear lower aralkyl, for example, benzyl, phenethyl, etc. and the nontoxic, pharmacologically acceptable salts thereof. The said salts include both the acid addition and quaternary ammonium derivatives of which the following are representative: the hydrochloride, hydrobromide, sulfate, phosphate, nitrite, acetate, succinate, adipate, propionate, tartrate, citrate, bicarbonate, pamoate, cyclohexylsulfamate, etc. and such quaternary ammonium salts as the lower alkyl halides, for example, methyliodide, ethyliodide, methylbromide, etc.

The foregoing salts enhance the usefulness of the relatively insoluble bornanemethylamine products (I) in pharmaceutical preparations. Of these the hydrochlorides and the cyclohexylsulfamates are preferred. The cyclohexylsulfates have a pleasant taste and, therefore, are particularly useful in preparing syrups for oral administration and in the preparation of uncoated tablets.

The salts of the instant products are derived from the instant bornanemethylamines (I) by conventional means as illustrated hereinbelow and to the extent that the said salts are both nontoxic and physiologically acceptable to the body system they are the functional equivalent of the corresponding bornanemethylamine products (I).

When R and $R^1$ in Formula I, supra, are dissimilar substituents the carbon to which they are attached (i.e., the carbon atom bridging the bornane ring and amino group) constitutes an asymmetric center and, therefore, the resulting products are obtained as a mixture of stereoisomers which, if desired, may be separated by conventional means as, for example, by recrystallization techniques, by vapor chromatography or by column chromatography. In addition, the asymmetric carbon at the 2 position of the bornane structure gives rise to a mixture of endo and exo position isomers which may also be separated out by methods known to those skilled in the art.

This invention embraces both the racemic and diastereoisomeric forms of the instant bornanemethylamine products (I). The individual stereoisomer derivatives, like their corresponding stereoisomeric mixtures, are also useful in the treatment of anti-viral diseases; however, the endo isomer of the (L-2-bornane)methylamine products generally exhibited a more pronounced anti-viral effect and, therefore, constitute a preferred aspect of this invention.

A preferred embodiment of this invention relates to 2-bornanemethylamines (Ia, infra) having the following general formula:

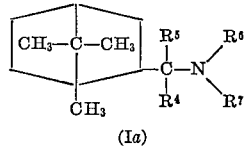

(Ia)

wherein $R^4$, $R^5$, $R^6$ and $R^7$ are similar or dissimilar members selected from hydrogen, methyl and ethyl and the nontoxic, acid addition salts thereof. The foregoing class of compounds exhibits particularly good anti-viral activity and therefore constitutes a preferred subgroup of compounds within the scope of this invention.

The products of this invention are conveniently obtained by several alternate routes. According to one method of preparation, and one which is particularly useful in preparing the stereoisomers of the instant products, a 2-bornane lower alkyl ketone (II, infra) is first epimerized by treatment with a basic reagent as, for example, by passage through a column of basic alumina and the endo-2-bornane lower alkyl ketone (III, infra) thus obtained is converted to the corresponding oxime (IV, infra) by treatment with hydroxylamine hydrochloride in basic solution followed by the addition of acid, and the resulting said endo-2-bornane methyl oxime (IV) is then reduced to the desired α-lower alkyl-(endo-2-bornane)methylamine salt (Ib, infra). Suitable reducing means include catalytic hydrogenation in the presence of ammonia as, for example, hydrogenation in the presence of Raney nickel and methanolic ammonia, or hydrogenation with platinum in acetic acid, etc. or molecular reduction such as sodium in alcohol, zinc dust in acetic acid, lithium aluminum hydride in ether, etc. If desired, the α-lower alkyl-(endo-2-bornane)methylamine salt (Ib) thus obtained may then be separated into racemic mixtures A and B by column chromatography on suitable adsorbents as, for example, on magnesium silicate, activated magnesium silicate or neutral alumina or by gas-liquid phase chromatography or by conventional recrystallization techniques. Elution from the adsorbent with methanol-methylene chloride yields solutions of the racemic mixtures A and B, infra, which are then concentrated by distillation through a fractionating column. The following equation wherein the racemic mixtures are separated by column chromatography, illustrates the process:

wherein the catalyst employed is Raney nickel illustrates the process; however, it is to be understood that other suitable catalysts may also be employed in an analogous manner to yield an identical product:

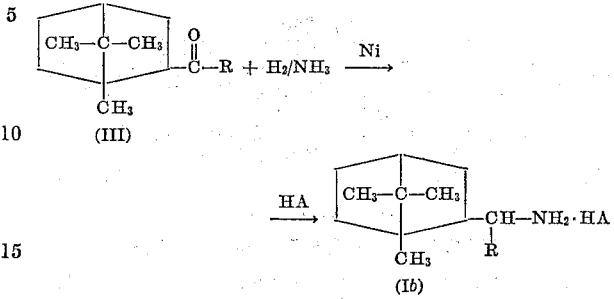

wherein R and HA are as defined above. In the foregoing

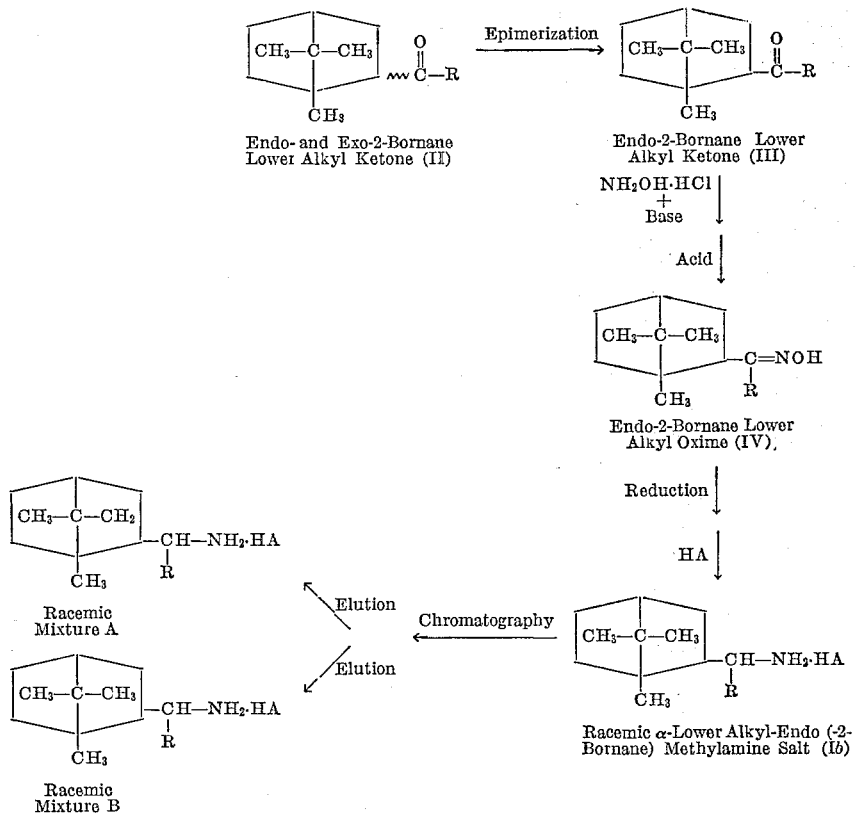

wherein HA is an organic or inorganic acid such as hydrochloric acid, etc. and R is as defined above. The foregoing equation illustrates the preparation of (endo-2-bornane)-methylamine products containing both the D and L bornane skeletal structures. In the event a particular stereoisomer is desired it is only necessary to employ the appropriate D- or L-2-bornane lower alkyl ketone starting material (II) to obtain the corresponding skeletal configuration in the bornane product (Ib). Also, in a manner similar to that described above for the preparation of the endo isomers of the instant products, the exo isomers may be obtained by employing a corresponding exo-2-bornane lower alkyl ketone for the endo-2-bornane lower alkyl ketone (III) described in the preceding equation and conducting the process in an otherwise analogous manner.

Alternatively, in lieu of converting the intermediate endo-2-bornane lower alkyl ketone (III) to the corresponding oxime (IV), as described above, the said ketone (III) may be converted directly to the α-lower alkyl-(endo-2-bornane)methylamine salt (Ib) by suitable reductive amination methods as, for example, by catalytic hydrogenation in the presence of ammonia followed by treatment with a suitable acid. The following equation equation the product (Ib) is a mixture of D and L skeletal stereoisomers; however, in the event a particular stereoisomer is desired one need only employ the appropriate D- or L-2-bornane lower alkyl ketone (III) starting material in an otherwise analogous process to obtain the desired skeletal configuration in the bornane product (Ib).

Another method of preparation but one which is limited to the synthesis of 2-bornanemethylamines wherein the methylene carbon bridging the amino group and bornane nucleus is unsubstituted, i.e., R and $R^1$ in Formula I, supra, both represent hydrogen (Ic, infra), consists in treating a 2-bornane carbonyl halide (V, infra) with ammonia or with an appropriate primary amine followed by the reaction of the resulting 2-bornanecarboxamide or N - monosubstituted - 2 - bornanecarboxamide (VI, infra) with a suitable reducing agent such as lithium aluminum hydride. The following equation illustrates this method of preparation but, again, the equation illustrates the preparation of a DL skeletal mixture of isomers and in the even a particular stereoisomer is desired it is only necessary to employ the appropriate (D- or L-2-bornane)carbonyl chloride starting material to obtain the desired (D- or L-2-bornane)methylamine product:

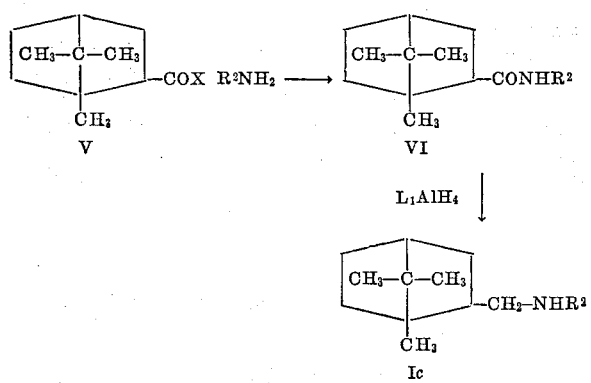

wherein X is halogen, for example, chlorine, bromine, etc. and $R^2$ is as defined above. Also, in the event the endo or the exo isomer of the (D- or L-2-bornane)methylamine product (Ic) is desired, it is only necessary to employ the corresponding D- or L-endo or exo-2-bornane carbonyl halide reactant (V) in the foregoing process to obtain the corresponding endo or exo product.

Certain N-monosubstituted-2-bornanecarboxamide products (Id, infra) of this invention may also be prepared by treating a 2-bornanemethylamine (VII, infra) with a suitable acyl halide in the presence of a base to yield an N-monosubstituted-2-bornanecarboxamide (VIII, infra), which intermediate is then reduced with lithium aluminum hydride or other suitable reducing agent to yield the desired product (Id). The following equation illustrates this method of preparation:

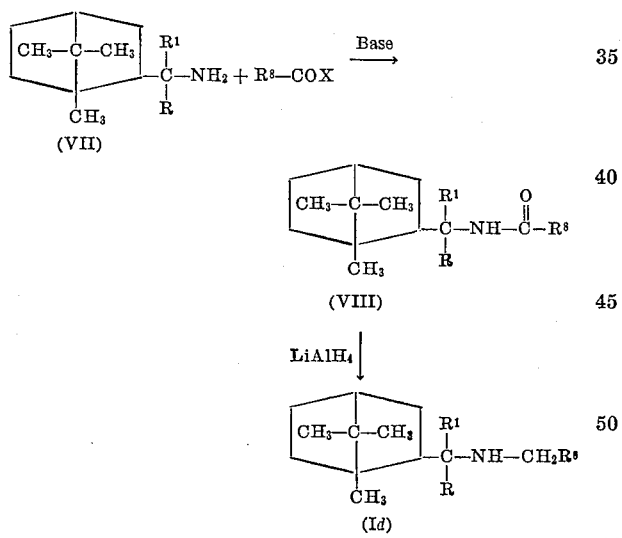

wherein R and $R^1$ are as defined above and $R^8$ is hydrogen, lower alkyl, for example, methyl, ethyl, n-propyl, n-butyl, etc., lower alkenyl, for example, vinyl, 1-methylvinyl, etc., and mononuclear aryl, for example, phenyl, benzyl, etc.

The N-monosubstituted-2-bornanemethylamines obtained via the two foregoing processes can be converted to their corresponding N,N-disubstituted-2-bornanecarboxamides by further treatment with acyl halide and reduction of the intermediate thus obtained as described in the preceding paragraph.

The N-lower alkyl and N-lower alkenyl substituted 2-bornanemethylamines are also conveniently obtained by treating a 2-bornanemethylamine (VII) with an equivalent amount of a lower alkyl halide or lower alkenyl halide at reflux in the presence of base. By employing two molar equivalents of lower alkyl halide or lower alkenyl halide a mixture of N-mono and N,N-di-substituted products are obtained in which the N,N-dialkyl and N,N-dialkenyl substituted derivatives predominate.

Also, the N-methyl substituted 2-bornanemethylamine products of this invention may be obtained by formylation of the amino group. According to this method a 2-bornanemethylamine (VII) is refluxed with formamide or formic acid or with a lower alkyl formate such as butyl formate, etc. and the resulting intermediate is then reduced by conventional means to the corresponding N-methyl-2-bornanemethylamine. If desired, the N,N-dimethyl-2-bornanemethylamines may be synthesized from the said N-methyl-2-bornanemethylamines by treatment with a mixture of formaldehyde and formic acid or by treatment with formaldehyde under catalytic hydrogenation.

Those products (I) wherein the methylene carbon (bridging the bicyclic ring and amino group) is substituted by lower alkyl are conveniently synthesized via the Grignard reaction. When, for example, a product which contains similar alkyl groups is desired a 2-bornane carbonyl halide (V) is caused to react with at least two equivalents of lower alkyl magnesium halide in ether and the α,α-di-lower alkyl-2-bornanecarbinol (IX, infra) thus formed is then treated with acetonitrile in a strong acid, such as sulfuric acid, and the resulting N-acetyl-α,α-di-lower alkyl-2-bornanemethylamine intermediate (X, infra) is treated with a strong base at raised temperatures for a protracted period and then with acid to yield the α,α-di-lower alkyl-2-bornanemethylamine salt (Ie, infra). The following equation illustrates this method of preparation:

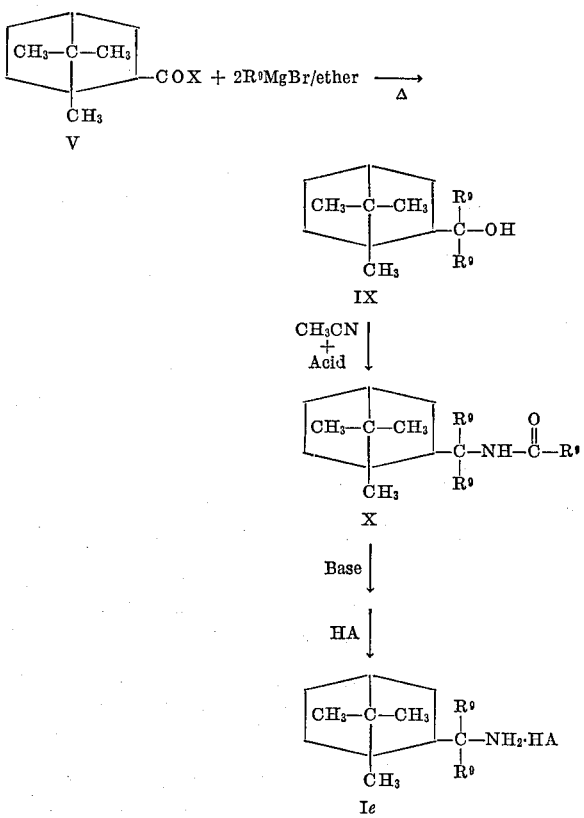

wherein the $R^9$ radicals represent similar lower alkyl groups and X and HA are as defined above.

A second Grignard synthesis and one which is suitable for preparing 2-bornanemethylamine products (If, infra) wherein the lower alkyl radicals on the methylene carbon are either similar or different consists in the reaction of a 2-bornane lower alkyl ketone (XI, infra) with lower alkyl magnesium halide in ether followed by the treatment of the α,α-di-lower alkyl-2-bornane carbinol (XII, infra) thus formed with acetonitrile in strong acid; treating the resulting N-acetyl-α,α-di-lower alkyl-2-bornanemethylamine intermediate (XIII, infra) with strong base at raised temperatures for a protracted period and then with acid to yield the desired α,α-di-lower alkyl-2-bornanemethylamine salt (If). The following equation illustrates this method of preparation:

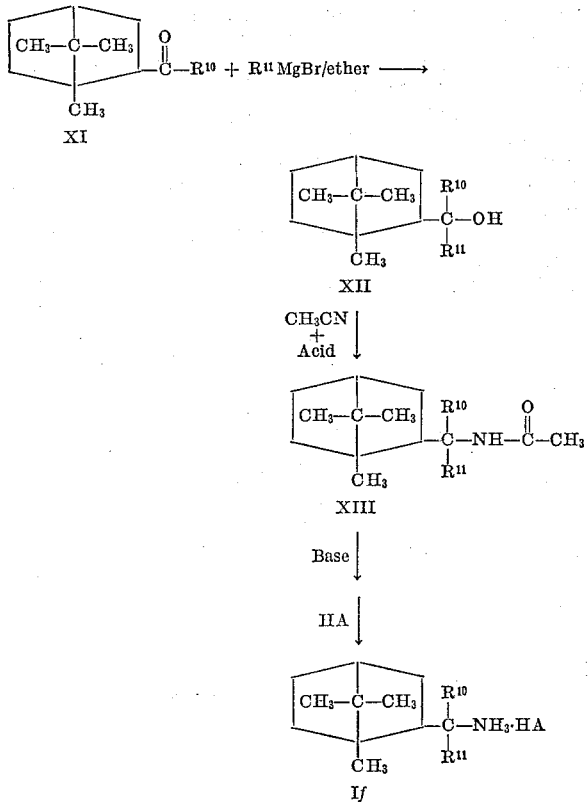

wherein the $R^{10}$ and $R^{11}$ radicals are similar or dissimilar lower alkyl substituents and HA is as defined above.

The N-(hydroxy-lower alkyl)-2-bornanemethylamines are synthesized by reaction of 2-bornanemethylamine with an alkylene oxide, preferably, in the presence of an acid catalyst such as p-toluenesulfonic acid.

Reaction of 2-bornanemethylamines with the appropriate mononuclear arylaldehyde such as benzaldehyde, etc., yields the corresponding aralkylidene, for example, the benzylidene which is then reduced by hydrogenation in the presence of palladium on carbon to yield the corresponding N-aralkyl-2-bornanemethylamine.

The salts of the instant products (I) are generally obtained as crystalline solids and, if desired, may be purified by recrystallization from a suitable solvent or mixtures of solvents such as mixtures of methanol and ether, methylene chloride and ether, petroleum ether and ethyl ether, etc.

The examples which follow illustrate the 2-bornanemethylamines (I) of this invention and the salts thereof and, also, the methods by which they may be prepared. However, the examples are illustrative only and it will be apparent to those having ordinary skill in the art that all of the instant products may be produced in an analogous manner by substituting the appropriate starting materials for those set forth in the examples.

EXAMPLE 1

α-Methyl-(L-endo-2-bornane)methylamine hydrochloride, diastereoisomers A and B

Step A.—L-endo-2-bornane methyl ketone.—An L-endo and exo mixture of 2-bornane methyl ketone in a 3:2 ratio as determined by gas-liquid phase chromatography is epimerized completely to the endo form by passage through a column of basic alumina using several solutions of pentaneethyl ether. The L-endo-2-bornane methyl ketone thus obtained has a boiling point of 102° C. at 11 mm. mercury; $n_D^{23}$ 1.4786, $[\alpha]_D^{25}$ +70.6°.

Step B.—L-endo-2-bornane methyl oxime.—To a stirred solution of L-endo-2-bornane methyl ketone (5.4 g., 0.030 mole) in 100 ml. of ethanol is added hydroxyamine hydrochloride (3.5 g., 0.050 mole) in 15 ml. of water followed by the addition of a 50% sodium hydroxide solution (8.0 ml., 0.10 mole). The mixture then is stirred at reflux for three hours. Upon cooling to room temperature the mixture is neutralized with dilute hydrochloric acid and then diluted with water until the solution becomes quite cloudy. Upon cooling to 0° C. a crystalline material forms which is then collected and recrystallized from an ethanol-water mixture to yield 5.9 g. of L-endo-2-bornane methyl oxime, M.P. 71–72° C.

Analysis.—Calculated for $C_{12}H_{21}NO$: C, 73.79; H, 10.84; N, 7.17. Found: C, 73.54; H, 10.58; N, 6.93.

Step C.—α-Methyl-(L-endo-2-bornane)methylamine hydrochloride diastereoisomers A and B (mixture).—L-endo-2-bornane methyl oxime (3.9 g., 0.020 mole) is hydrogenated at 70° C. and 1700 p.s.i. for three hours in 15 ml. methanol saturated with anhydrous ammonia using one-quarter teaspoon of Raney nickel. The mixture is filtered through diatomaceous earth and the filtrate concentrated to a small volume by distillation through a fractionating column. The concentrate then is taken up in ethyl ether and hydrochloric acid (1 normal) and the aqueous solution washed with ether and made basic with concentrated sodium hydroxide. The product is then taken up in ethyl ether and petroleum ether, washed with water and dried over magnesium sulfate. Hydrogen chloride is bubbled into the ether solution whereupon crystalline α-methyl-(L-endo-2-bornane)methylamine hydrochloride (1.94 g.) M.P. 325–326° C. $[\alpha]_D^{25}$ +21.2° separates out. Concentration of the filtrate thus obtained yields additional material, raising the total yield of product to 2.83 g. (75%). The α-methyl-L-endo-2-bornane)methylamine hydrochloride thus obtained is a mixture of diastereoisomers A and B as determined by thin layer chromatography of the free base on 250 micron alumina G plates developed with a mixture of methylene chloride and methanol (95:5). The Rf values for the diastereoisomers A and B are 0.4 and 0.7, respectively. (Note: The abbreviation Rf is the ratio of the distance traveled by the isomeric product divided by the distance simultaneously traveled by the developer, i.e., the methylene chloride-methanol mixture. A discussion of chromatographic Rf values appears in the text: "Chromatography," by E. Heftmann; page 101, 1961; Reinhold Publishing Corporation, New York.)

Analysis.—Calculated for $C_{12}H_{24}ClN$: C, 66.18; H, 11.11; Cl, 16.28; N, 6.43. Found: C, 66.20; H, 11.07; Cl, 16.43; N, 6.70.

Step D.—α-Methyl-(L-endo-2-bornane)methylamine hydrochloride, diastereoisomers A and B.—The α-methyl-(L-endo-2-bornane)methylamine hydrochloride diastereoisomers A and B (3.0 g.) of step C are dissolved in water and excess dilute sodium hydroxide (2.5 normal) is added under nitrogen. The mixture of α-methyl-(L-endo-2-bornane)methylamine diastereoisomers A and B thus obtained is then extracted with ether and the ether solution is washed with water, dried over anhydrous magnesium sulfate and evaporated by distillation. The purified diastereoisomeric mixture of α-methyl-(L-endo-2-bornane)methylamine (2.6 g., 0.014 mole) is then dissolved in methylene chloride and methanol (99:1) and passed onto a column of magnesium silicate (110 g.) packed in the same solvent. The α-methyl-(L-endo-2-bornane)methylamine diastereoisomer A (Rf: 0.7) is eluted with 2% methanol and the slower component, diastereoisomer B (Rf: 0.4) is eluted with 10% methanol. Both solutions are then concentrated by distillation through a fractionating column and the residues converted to the hydrochloride salts by addition of hydrogen chloride into ether solutions. Recrystallization from a methanol-ether mixture yields 0.74 g. (29%) of α-methyl-(L-endo-2-bornane) methylamine hydrochloride (diastereoisomer A), M.P. 354–355° C. $[\alpha]_D^{25}$ +23.8° and 0.30 g. (11%) of α-methyl-(L-endo-2-bornane)methylamine hydrochloride (diastereoisomer B), M.P. 364–365° C. $[\alpha]_D^{25}$ +21.3°.

*Analysis.*—Calculated for $C_{12}H_{24}ClN$: C, 66.18; H, 11.11; N, 6.43. Found—diastereoisomer A: C, 66.10; H, 10.77; N, 6.67; found—diastereoisomer B: C, 65.85; H, 10.88; N, 6.65.

EXAMPLE 2

α-Methyl-(L-endo-2-bornane)methylamine hydrochloride

L-2-bornane methyl ketone (1.8 g., 0.010 mole) in 15 ml. of ethanol and 10 ml. of liquid ammonia is hydrogenated at 2000 p.s.i. and 150° C. for six hours using one-quarter teaspoon of Raney nickel catalyst. The mixture is filtered through diatomaceous earth and the filtrate is concentrated to a small volume by distillation through a fractionating column. The concentrate is then taken up in ethyl ether and 1 normal hydrochloric acid. The aqueous layer is washed with ether and then made basic with 50% sodium hydroxide solution. The product separates and is extracted into ethyl ether. Upon extraction with water, the ether solution is dried over magnesium sulfate. Hydrogen chloride is then bubbled into the ether solution whereupon crystalline α-methyl-(L-endo-2-bornane)methylamine hydrochloride, M.P. 325–326° C. separates out. The product contains both diastereoisomers A and B as determined by chromatography; however, in the mixture the B isomer, M.P. 364–365° C., predominates.

EXAMPLE 3

2-bornanemethylamine hydrochloride

Step A.—2-bornanecarboxamide.—Into a stirred solution of 2-bornane carbonyl chloride (6.0 g., 0.030 mole) in dry methylene chloride (250 ml.) is distilled 2 equivalents of dry ammonia. The mixture is stirred at room temperature for three hours and then diluted with water (200 ml.). The methylene chloride layer is then washed with water, with dilute hydrochloric acid, with water, with dilute sodium hydroxide, again with water and then dried over magnesium sulfate. The solvent then is evaporated and the residue recrystallized from methylene chloride-hexane to yield 2-bornanecarboxamide.

Step B.—2 - bornanemethylamine hydrochloride.—To lithium aluminum hydride (3.5 g., 0.090 mole) is added 2-bornanecarboxamide (9.0 g., 0.05 mole) in 150 ml. of dry tetrahydrofuran over a period of 30 minutes with stirring. After refluxing for 12 hours, the mixture is cooled and water (16.6 ml.) is added with stirring. The supernatant ether is filtered off, extracted with water and dried over magnesium sulfate. The solution is then treated with hydrogen chloride to precipitate a product which upon recrystallization from methanol-ether is identified as 2-bornanemethylamine hydrochloride.

EXAMPLE 4

N-benzyl-2-bornanemethylamine hydrochloride

Step A.—N - benzyl - 2 - bornanecarboxamide.—To a stirred solution of 2-bornane carbonyl chloride (6.0 g., 0.030 mole) in dry methylene chloride (200 ml.) is added, with stirring, a solution of 2 equivalents of benzylamine in dry methylene chloride (100 ml.). The mixture is stirred at room temperature for three hours and diluted with 200 ml. of water. The organic layer is washed with water, with dilute hydrochloric acid, with water, with dilute sodium hydroxide, and again with water and then dried over magnesium sulfate. Evaporation of the solvent furnishes N-benzyl-2-bornanecarboxamide which is recrystallized from methylene chloride-hexane to yield pure product.

Step B.—N-benzyl-2-bornanemethylamine hydrochloride.—Lithium aluminum hydride (3.5 g., 0.090 mole) in dry ethyl ether (600 ml.) is added to N-benzyl-2-bornanecarboxamide (13.5 g., 0.05 mole) in 150 ml. of dry tetrahydrofuran over a period of 30 minutes with stirring. After refluxing for 12 hours, the mixture is cooled, and 16.6 ml. of water is added with stirring. The supernatant ether is filtered off, washed with water and dried over magnesium sulfate. The product thus obtained is then precipitated with hydrogen chloride and recrystallized from methylene chloride-ether to yield pure N-benzyl-2-bornanemethylamine hydrochloride.

EXAMPLE 5

N-methyl-2-bornanemethylamine hydrochloride

Step A.—N-methyl-2-bornanecarboxamide.—By substituting methylamine for the benzylamine in Example 4, step A, and following the procedure described therein the compound N-methyl-2-bornanecarboxamide is obtained.

Step B.—N-methyl-2-bornanemethylamine hydrochloride.—By substituting N-methyl-2-bornanecarboxamide for the N-benzyl-2-bornanecarboxamide of Example 4, Step B, and following the procedure described therein, the product N-methyl-2-bornanemethylamine hydrochloride is obtained.

EXAMPLE 6

N-(2-diethylaminoethyl)-2-bornanemethylamine hydrochloride

Step A.—N - (2-diethylaminoethyl)-2-bornanecarboxamide.—To a stirred solution of 2-bornane carbonyl chloride (6.0 g., 0.030 mole) in dry methylene chloride (200 ml.) is added, with stirring, a solution of 2 equivalents of diethylaminoethylamine in dry methylene chloride (100 ml.). The mixture is stirred at room temperature for three hours and then diluted with dilute sodium hydroxide solution (200 ml.). The methylene chloride layer is extracted with water and then dried over magnesium sulfate. Evaporation of the solvent yields N-(2-diethylaminoethyl)-2-bornanecarboxamide in the form of an oil.

Step B.—N - (2-diethylaminoethyl)-2-bornanemethylamine hydrochloride.—To lithium aluminum hydride (3.5 g., 0.090 mole) in dry ethyl ether (600 ml.) is added N-(2-diethylaminoethyl-2-bornanecarboxamide (14.0 g., 0.05 mole) in dry tetrahydrofuran (150 ml.) over a period of 30 minutes with stirring. After refluxing for 12 hours the mixture is cooled and water (16.6 ml.) is added with stirring. The supernatant ether is then filtered, washed with water and dried over magnesium sulfate. The product is then precipitated with 1 equivalent of hydrogen chloride and recrystallized from methanol-ether to yield pure N-(2-diethylaminoethyl)-2-bornanemethylamine hydrochloride.

EXAMPLE 7

α,α-Diethyl-2-bornanemethylamine hydrochloride

Step A.—α,α-Diethyl-2-bornanecarbinol.—To a solution of 2-bornane carbonyl chloride (30.0 g., 0.15 mole) in dry ethyl ether (500 ml.) is added dropwise a molar ethyl magnesium bromide (125 ml.) at a rate sufficient to maintain reflux. Reflux is then continued for one hour and a saturated ammonium chloride solution (300 ml.) is added to the cooled mixture. The aqueous layer is separated and extracted with one portion methylene chloride and the combined organic solutions dried over magnesium sulfate and evaporated to dryness. The resulting residue is chromatographed on silica gel packed in petroleum ether. The column is then washed with petroleum ether and the product eluted with a 10% ethyl ether solution. Evaporation of the ether solution furnishes α,α-diethyl-2-bornanecarbinol.

Step B.—N-acetyl - α,α - Diethyl - 2 - bornanemethylamine.—Concentrated sulfuric acid (35 ml.) is added dropwise to acetonitrile (160 ml.) at just below 10° C.

α,α-Diethyl-2-bornanecarbinol (21 g., 0.11 mole) is then added to the mixture and the temperature raised to 48° C. for 45 minutes. The mixture is poured slowly into one liter of ice water with stirring. The insolubles which separate are collected, dried and then chromatographed on silica gel packed in methylene-chloride. The product is eluted with 10% ethyl ether and recrystallized from hexane to yield crystalline N-acetyl, α-α-diethyl-2-bornanemethylamine.

Step C.—α,α - Diethyl - 2-bornanemethylamine hydrochloride.—N - acetyl - α,α-diethyl-2-bornanemethylamine (20 g., 0.084 mole), potassium hydroxide (100 g., 1.8 mole) and methanol (400 ml.) are heated at 225° C. for 18 hours. The mixture is taken up in a solution of ether-water and the water extracted with ether. The combined ether solutions are dried over magnesium sulfate and the product precipitated with hydrogen chloride. Recrystallization from methanol-ether yields the product α,α-diethyl-2-bornanemethylamine hydrochloride.

EXAMPLE 8

α-Ethyl-α-methyl-2-bornanemethylamine hydrochloride

Step A.—α-Ethyl-α-methyl-2-bornanecarbinol.—To a solution of 2-bornane methyl ketone (30 g., 0.16 mole) in dry ethyl ether (500 ml.) is added dropwise 3 molar ethyl-magnesium bromide (75 ml.) at a rate sufficient to maintain reflux. Reflux is continued for 8 hours and then a saturated solution of ammonium chloride (300 ml.) is added to the cooled mixture. The aqueous layer is then separated and extracted with methylene chloride. The organic solution is then washed with water, dried over magnesium sulfate, and evaporated to dryness. The resulting residue is then chromatographed on silica gel packed in petroleum ether. The column is washed with petroleum ether and the product is eluted with a 10% ethyl ether solution. Evaporation of the ether solutions yields α-ethyl-α-methyl-2-bornanecarbinol.

Step B.—α-Ethyl-α-methyl-2-bornane methylamine hydrochloride.—By substituting α-ethyl-α-methyl-2-bornanecarbinol for the α,α-dimethyl-2-bornanecarbinol of Example 7, Step B and following the procedure described therein, the product α-ethyl - α - methyl-2-bornanemethylamine hydrochloride is obtained.

EXAMPLE 9

N-ethyl-α-methyl-2-bornanemethylamine hydrochloride

Step A.—N - acetyl-α-methyl-2-bornanemethylamine.— To α-methyl-2-bornanemethylamine (12.0 g., 0.057 mole) with ice cooling is added acetyl chloride (24 ml.) in four 6 ml. portions with stirring over a 15-minute period. To the resulting slurry is slowly added a 20% sodium hydroxide solution (120 ml.) with stirring. After three hours the reaction mixture is diluted with water (400 ml.) and extracted with three 120 ml. portions of benzene. The benzene extracts are washed with water, then with 2.5 normal hydrochloric acid and again with water. The benzene layer is dried over magnesium sulfate and the solvent evaporated. The residue is then recrystallized from hexane to yield N-acetyl-α-methyl-2-bornanemethylamine.

Step B.—N-ethyl-α-methyl-2-bornanemethylamine hydrochloride.—To lithium aluminum hydride (7.0 g., 0.18 mole) in anhydrous ethyl ether (1.2 liter) is added N-acetyl-α-methyl-2-bornanemethylamine (22.0 g., 0.10 mole) in tetrahydrofuran (400 ml.) over a period of 45 minutes. After refluxing for 12 hours the mixture is cooled and water (33.2 ml.) is added with stirring. The supernatant ether is then filtered off and washed with water. After drying over magnesium sulfate, the filtrate is concentrated to a small volume and the product precipitated with hydrogen chloride. Recrystallization from methanol-ether yields a product identified as N-ethyl-α-methyl-2-bornanemethylamine hydrochloride.

EXAMPLE 10

N-benzyl-N-ethyl-α-methyl-2-bornanemethylamine hydrochloride

Step A.—N - benzoyl - N - ethyl - α - methyl - 2-bornanemethylamine.—To N - ethyl - α - methyl - 2-bornanemethylamine (6.0 g., 0.03 mole) is added benzoyl chloride (12 ml.) in 3 ml. portions with stirring over a 10-minute period while cooling in ice. To the resulting slurry a 20% sodium hydroxide solution (60 ml.) is slowly added. Stirring is continued for three hours and then the mixture is diluted with water (200 ml.) and extracted with three portions of benzene (60 ml.). The combined benzene solutions are washed with water, with 2.5 normal hydrochloric acid and then with water. The solution is dried over magnesium sulfate, evaporated and the residue recrystallized from hexane to yield N-benzoyl-N-ethyl-α-methyl-2-bornanemethylamine.

Step B.—N - benzyl - N - ethyl - α - methyl - 2 - bornanemethylamine hydrochloride.—To lithium aluminum hydride (3.50 g., 0.090 mole) in dry ethyl ether (600 ml.) is added N-benzoyl-N-ethyl-α-methyl-2-bornanemethylamine hydrochloride (15.7 g., 0.05 mole) in dry tetrahydrofuran (150 ml.) over a period of 30 minutes with stirring. After refluxing for 12 hours the mixture is cooled and 16.6 ml. of water is added with stirring. The supernatant ether is filtered, washed with water and dried over magnesium sulfate. The product is then precipitated with hydrogen chloride and recrystallized from methanol-ether to yield N - benzyl-N-ethyl-α-methyl-2-bornanemethylamine hydrochloride.

EXAMPLE 11

N-methyl-α-methyl-(L-endo-2-bornane)methylamine hydrochloride

Step A.—N-formyl - α - methyl - (L - endo-2 - bornane)methylamine.—A solution of α-methyl-L-bornylmethylamine hydrochloride (5.0 g., 0.023 mole) in formamide (40 ml.) is heated at 150° C for 30 minutes and then poured into water (900 ml.). The crude product which separates is collected by filtration. After rinsing with water, the product is taken up in ethyl ether and washed with cold dilute hydrochloric acid. After drying over magnesium sulfate, the ether is then evaporated to yield 3.9 g. of N-formyl-α-methyl-(L-endo-2-bornane) methylamine as a waxy solid.

Step B.—N - methyl - α - methyl - (L - endo - 2 - bornane)methylamine hydrochloride.—To a stirred solution of lithium aluminum hydride (3.4 g., 0.090 mole) in dry ethyl ether (200 ml.) is added dropwise a solution of N-formyl - α - methyl - (L - endo - 2 - bornane)methylamine (3.5 g., 0.016 mole) in dry ethyl ether (100 ml.). The mixture is then stirred at reflux for 20 hours and upon cooling, water (5 ml.) is carefully added. The resulting inorganic solids are filtered, rinsed with ether and the filtrate then extracted with water and dried over magnesium sulfate. The product is then precipitated by bubbling hydrogen chloride gas into the ether solution. The resulting precipitate is collected, rinsed with ether and dried to yield 2.9 g. of N-methyl-α-methyl-(L-2-bornane) methylamine hydrochloride diastereoisomers, M.P. 221–224° C. An analytical sample obtained by recrystallization from methanol-ether yields pure N-methyl-α-methyl-(L-endo-2-bornane)methylamine hydrochloride.

*Analysis.*—Calculated for $C_{13}H_{26}ClN$: C, 67.34; H, 11.31; N, 6.04. Found: C, 67.73; H, 11.15; N, 6.09.

EXAMPLE 12

N,N-dimethyl-α-methyl-(L-endo-2-bornane)methylamine hydrochloride pentahydrate

A solution of N-methyl-α-methyl-(L-endo-2-bornane) methylamine hydrochloride (4.35 g., 0.020 mole), 37% aqueous formaldehyde, (8.2 g., 0.10 mole), 5% palladium on charcoal (0.5 g.) and sodium acetate (0.18 g., 0.002 mole) is shaken under 40 p.s.i. of hydrogen for 72 hours at room temperature. The catalyst is removed by filtration through diatomaceous earth and the filtrate evaporated. A solution of the residue in ethanol is then evaporated to remove formaldehyde and the resulting solution is taken up in water and extracted with ether. The aqueous solution is then made basic with 50% sodium hydroxide (10 ml.) and the product extracted into ether. The ether solution is dried over magnesium sulfate and hydrogen chloride is then bubbled into the solution to precipitate the product. Upon evaporation of the solvent a hygroscopic viscous residue forms which, after drying under high vacuum over potassium hydroxide pellets and then at 100° C., yields N,N-dimethyl-α-methyl-(L-endo-2-bornane)methylamine hydrochloride pentahydrate diastereoisomers, M.P. 185–186° C. Recrystallization from methanol-ether yields a pure analytical sample of the product.

*Analysis.*—Calculated for $C_{14}H_{27}N \cdot HCl \cdot 5H_2O$: C, 68.40; H, 11.48. Found: C, 68.60; H, 11.21.

EXAMPLE 13

N,N,N-trimethyl-α-methyl-2-bornanemethyl-amine iodide

A mixture containing α-methyl-2-bornanemethylamine (4.0 g., 0.022 mole), methyliodide (12.4 ml., 0.20 mole) and anhydrous potassium carbonate (5.2 g., 0.04 mole) in dry acetone (500 ml.) is stirred at reflux for 18 hours. On cooling, methanol is added to dissolve the resulting product. Insoluble material is then removed by filtration and the filtrate is evaporated to dryness. The residue then is recrystallized several times with filtration from methanol-ether to yield N,N,N-trimethyl-α-methyl-2-bornane-methylamine iodide.

EXAMPLE 14

N,N-dimethyl-α-methyl-2-bornanemethylamine hydrochloride

To a solution of α-methyl-2-bornanemethylamine (4.4 g., 0.024 mole) and 2.0 equivalents of methylbromide in ethanol (300 ml.) maintained at reflux is added dropwise with stirring a 1 normal sodium hydroxide solution (45 ml.). Refluxing is continued for 16 hours and the solution is then evaporated to a small volume. The mixture is taken up in ether-water and the ether layer is washed with water and dried over magnesium sulfate. Evaporation of the solution yields a residue which is chromatographed on neutral alumina (200 g.) packed in petroleum ether-methylene chloride (1:1). The product is then eluted with methylene chloride and treated with ethereal hydrogen chloride. Recrystallization of the product from methanol-ether yields crystalline N,N-dimethyl-α-methyl-2-bornanemethylamine hydrochloride.

EXAMPLE 15

N-allyl-α-methyl-2-bornanemethylamine and N,N-diallyl-α-methyl-2-bornanemethylamine To a solution of α-methyl-2-bornanemethylamine hydrochloride (19.0 g., 0.087 mole) and sodium bicarbonate (25 g., 0.30 mole) in absolute ethanol (250 ml.) is added, dropwise, allyl bromide (12 g., 0.10 mole). The mixture is stirred at reflux until evolution of carbon dioxide ceases. The resulting solution is then filtered and the filtrate evaporated to yield a residue which is taken up in a solution of ether and dilute sodium hydroxide. The ether solution is washed thoroughly with water and then dried over magnesium sulfate. The residue then is chromatographed on neutral alumina and eluted with petroleum ether-ethyl ether to yield N-allyl-α-methyl-2-bornanemethylamine and N,N-diallyl-α-methyl-2-bornanemethylamine.

EXAMPLE 16

N-(2′-hydroxyethyl)-α-methyl-2-bornanemethylamine hydrochloride

Ethylene oxide (6 ml., 0.12 mole) is added to an ice cold solution of α-methyl-2-bornanemethylamine (4.4 g., 0.024 mole) and p-toluenesulfonic acid (45 mg.) in methanol (250 ml.) with stirring. Stirring is continued for 16 hours at 0–5° C. and at 25° C. for 8 hours. The solution is then evaporated to dryness and the residue taken up in ether. The resulting solution is treated with hydrogen chloride to yield a crystalline solid which is recrystallized from methanol-ether to yield N-(2′-hydroxyethyl) - α - methyl - 2 - bornanemethylamine hydrochloride.

EXAMPLE 17

N-benzyl-α-methyl-2-bornanemethylamine hydrochloride

A mixture of α-methyl-2-bornanemethylamine (10.0 g., 0.055 mole) and benzaldehyde (6.9 g., 0.065 mole) in benzene (100 ml.) is refluxed for three hours. Water is then separated by a Dean-Stark apparatus and the resulting mixture is hydrogenated at low pressure using 5% palladion-on-carbon (1.0 g.) as catalyst. The resulting mixture is then filtered, concentrated to an oily residue and treated with an ether solution of hydrogen chloride. The product thus obtained is recrystallized from methylene chloride-ether to yield N-benzyl-α-methyl-2-bornanemethylamine hydrochloride.

EXAMPLE 18

N-benzyl-2-bornanemethylamine hydrochloride

Step A.—N-phenyl-2-bornanecarboxamide.—To a solution of 2-bornane carbonyl chloride (6.0 g., 0.030 mole) in dry methylene chloride (200 ml.) is added with stirring a solution of aniline (2 equivalents) in dry methylene chloride (100 ml.). The mixture is stirred at room temperature for three hours and then diluted with water (200 ml.). The organic layer is then washed successively with water, dilute hydrochloric acid, water, dilute sodium hydroxide, again with water and then dried over magnesium sulfate. Evaporation of the solvent yields N-phenyl-2-bornanecarboxamide which upon recrystallization from methylene chloride-hexane yields a purified product.

Step B.—N-benzyl - 2 - bornanemethylamine hydrochloride.—To lithium aluminum hydride (3.5 g., 0.092 mole) in dry ethyl ether (600 ml.) is added N-phenyl-2-bornanecarboxamide (13.0 g., 0.050 mole) in dry tetrahydrofuran (150 ml.) over a period of 30 minutes with stirring. After refluxing for 12 hours, the mixture is cooled and water (16.6 ml.) is added with stirring. The supernatant ether is filtered, washed with water and then dried over magnesium sulfate. The product thus obtained is precipitated with hydrogen chloride and recrystallized from methylene chloride-ether to yield pure N-benzyl-2-bornanemethylamine hydrochloride.

EXAMPLE 19

α,α-dimethyl-2-bornanemethylamine hydrochloride

Step A.—α,α-dimethyl - 2 - bornanecarbinol.—To a solution of 2-bornane carbonyl chloride (31.5 g., 0.160 mole) in dry ethyl ether (500 ml.) is added dropwise 3 molar methylmagnesium bromide (150 ml.) at a rate sufficient to maintain reflux. Reflux is continued for one hour and then a saturated solution of ammonium chloride (300 ml.) is added to the cooled mixture. The aqueous layer is then separated and extracted with one portion of methylene chloride. The combined organic solutions are dried over magnesium sulfate and evaporated to dryness. The resulting residue is then chromatographed on silica gel and the column is washed with petroleum ether and the product eluted with 10% ethyl ether. Evaporation of the solution thus obtained yields α,α-dimethyl-2-bornanecarbinol.

Step B.—N - acetyl - α,α - dimethyl - 2 - bornanemethylamine.—Concentrated sulfuric acid (35 ml.) is added dropwise to acetonitrile (160 ml.) while maintaining the temperature at 5–10° C. α,α-dimethyl-2-bornanecarbinol (21.0 g., 0.011 mole) is added to the mixture and the temperature is then raised to 48° C. for 45 minutes. The mixture is poured slowly into ice water (one liter) with stirring and the residue which separates is collected and dried. The product then is chromatographed on silica gel using petroleum ether-ethyl ether to yield N-acetyl-α,α-dimethyl-2-bornanemethylamine.

Step C.—α,α-dimethyl-2-bornanemethylamine hydrochloride.—N - acetyl - α,α - dimethyl - 2 - bornanemethylamine (20.0 g., 0.085 mole), potassium hydroxide (100 g.) and methanol (400 ml.) are heated at 225° C. for 18 hours. The mixture is then taken up in ether-water and the water extracted with ether. The ether solution is dried over magnesium sulfate and hydrogen chloride is then bubbled through the solution. The resulting precipitate is recrystallized from methanolether to yield α,α-dimethyl-2-bornanemethylamine hydrochloride.

The 2-bornanemethylamine products (I) of this invention and the nontoxic, pharmacologically acceptable salts thereof are effective inhibitors of influenza-causing viruses. In mouse tests against the influenza $A_2$ Jap 305 and Al—Ann Arbor strain of flu viruses the said products (I) show a marked inhibition in the incidence of viral infection without inducing the hyperirritability and hyperactivity usually associated with central nervous system activity.

The active ingredients of this invention may be employed in any one of a variety of compositions as, for example, in such dosage forms as capsules, tablets, powders or liquid solutions or as suspensions or elixirs and may be administered orally, parenterally, intravenously, intramuscularly or intraperitoneally.

The dosage to be administered depends largely upon the strain of virus to be treated and upon the degree of infection; however, in general, a daily dosage consists of from about 0.1 to about 25 mg. of active ingredient per kg. of body weight in one or more applications per day. A preferred daily dosage lies in the range of from about 0.5–5.0 mg. of active ingredient per kg. of body weight.

In addition to containing active ingredient the instant anti-viral compositions also contain a solid or liquid nontoxic pharmaceutical carrier. Suitable carriers include, for example, sterile liquids such as water, mannitol, sucrose, glucose, saline, glycols and oils of a petroleum, animal, vegetable or synthetic origin as, for example, peanut oil, mineral oil and sesame oil.

In addition, the instant compositions may also include other ingredients such as stabilizers, binders, anti-oxidants, preservatives, lubricators, suspending agents, viscosity aids, flavoring agents and the like.

There may also be included in the composition, in conjunction with the 2-bornanemethylamines (I), other active ingredients to provide a broad spectrum of activity. Thus, for example, in the treatment of influenza, a commonly encountered complication is the occurrence of viral pneumonia which may be treated by including within the anti-viral composition appropriate antibiotics and antihistamines. The type and amount of ancillary ingredients to be included will depend upon the malady to be treated and can thus be easily determined by those skilled in the art.

The compositions of the instant invention may be administered in several unit dosage forms. Thus, for example, where parenteral administration is desired the compounds are advantageously employed as sterile aqueous or oleaginous solutions or suspensions. However, the salts of the instant 2-bornanemethylamines (I) are generally water soluble compounds and, therefore, when salts are employed aqueous solutions are preferred. In either event, the active ingredient is suitably present to the extent of from about 0.5–25% (w./v.) and preferably from 1–10%. When aqueous injectables are desired the composition should preferably contain sufficient salt as to be essentially isotonic in character. Salts which may be employed include, for example, sodium citrate, sodium borate, sodium chloride and the like. Similarly, the pH of the solution should approximate that of the body fluids in the area of the parenteral administration. This may be accomplished by including in the solution acids which are typically nonirritating such as citric, acetic, boric, phosphoric, lactic, malic, gluconic, hydrochloric, tartaric and sulfuric acids and the like; however, hydrochloric acid is preferred. When oleaginous formulations are desired any pharmaceutically acceptable oil vehicles such as sesame oil, peanut oil, corn oil and the like may be employed.

The instant compositions may also take the form of solid or liquid orally ingestable unit dosage forms in which case the active ingredient is admixed with an orally ingestible pharmaceutically acceptable solid or liquid such as mannitol, sorbitol, sucrose, calcium, phosphate or water or a vegetable oil such as neanut oil or with sesame oil, corn oil or with alcohol and the like. The compositions, whether liquid or solid, will generally contain from about 10 mg., 1.75 g. by weight of the active drug based on the total weight of the composition and depending upon the type of formulation desired. However, a range of from about 35–350 mg. is preferably employed. In addition, the compositions may also include other ingredients such as stabilizers, binders, anti-oxidants, preservatives, lubricators, suspending agents, viscosity aids, flavoring agents and the like.

Another suitable formulation is a chewable tablet in which the drug is present to the extent of about 10 mg., 1.75 g. by weight and preferably from 35–350 mg. by weight in a pharmaceutically acceptable orally ingestible solid carrier as has been previously mentioned. Again, if desired, the composition may also contain flavors, binders, lubricants and other excipients known in the art. Tablets suitable for chewing should weigh, in general, from 3–4 grams and should contain approximately 35–350 mg. of active ingredient. Tablets desired for swallowing rather than chewing may be prepared, absent the gum base, by employing proportionately smaller amounts of ingredients.

A preferred route for oral administration is in the form of a soft gelatin capsule. Such compositions may contain from 35–350 mg. by weight of active ingredient dissolved or suspended in a pharmaceutically acceptable oil such as those mentioned above or in alcohol, glycerine, water or the like. Thus, for example, a suitable unit dosage capsule may be prepared by mixing 50 mg. of a 2-bornanemethylamine (I) or a suitable acid addition salt thereof, with 144 mg. of lactose and 6 mg. of magnesium stearate and placing the 200 mg. mixture into a No. 3 gelatin capsule. Similarly, by employing more of the active ingredient and less lactose other dosage forms can be put up in No. 3 gelatin capsules and, should it be necessary to mix more than 200 mg. of ingredients together, larger capsules may be employed.

The active ingredient may also be formulated as a liquid solution or suspension or as a dry powder, the latter to be used in drinking water, fruit juice, vegetable juice and the like. For orally administratable liquids, aqueous solutions of the active ingredient in the form of its salt is preferred at concentrations of from about 1–5% (w./v.). Also, preservatives, flavoring agents and the like may be added and, if desired, alcohol may be added to provide elixir type formulations.

With regard to the preparation of dry powders containing the active ingredient in a water-insoluble form, the composition should contain a minor amount of a suspending agent to aid in the suspension of the material.

Also, if desired, a flavoring agent such as a sugar and a preservative may be employed. The following composition illustrates the preparation of a water-insoluble dry powder dosage form:

| | Percent by weight |
|---|---|
| Drug | 50–99.5 |
| Suspending agent | 0.5–3.0 |
| Flavoring agent | 0–30.0 |
| Preservative | 0–1.0 |

Dry powders containing a water-soluble form of the active ingredient may also contain up to about 60% by weight of flavoring agent such as sorbitol, mannitol, sucrose and the like and, also, a preservative. The following composition illustrates the preparation of a representative dosage form:

| | Percent by weight |
|---|---|
| Drug | 25–90 |
| Flavoring agent | 10–60 |
| Preservative | 0–1.0 |

The foregoing dosage forms are illustrative only. In practice the dose to be administered will depend upon the virus to be treated, upon the age, health and weight of the patient and upon the extent of infection, the nature of concurrent treatment if any, the frequency of treatment and the effect desired.

The following example illustrates the preparation of a representative dosage form containing one of the instant 2-bornanemethylamines (I) as active ingredient. However, the example is illustrative only and those skilled in the art will appreciate that other compositions may be prepared in an analogous manner and are meant to be included within this invention.

EXAMPLE 20

Dry-filled capsules containing 50 mg. of active ingredient per capsule

| | Per capsule, mg. |
|---|---|
| α-Methyl - (L-endo-2-bornane)-methylamine hydrochloride | 50 |
| Lactose | 144 |
| Magnesium stearate | 6 |
| Capsule size No. 3 | 200 |

The α-methyl - (L-endo-2-bornane)methylamine hydrochloride is reduced to a No. 60 powder and then lactose and magnesium stearate are passed through a No. 60 bolting cloth onto the powder and the combined ingredients admixed for 10 minutes and then filled into No. 3 dry gelatin capsules.

Similar dry-filled capsules can be prepared by replacing the active ingredient of the above example by any of the other novel compounds of this invention.

It will be apparent from the foregoing description that the 2-bornanemethylamine products of this invention and their salt derivatives constitute a valuable class of compounds which have not been prepared heretofore. One skilled in the art will also appreciate that the processes disclosed in the above examples are merely illustrative and are capable of a wide variation and modification without departing from the spirit of this invention.

We claim:

1. A compound having the formula:

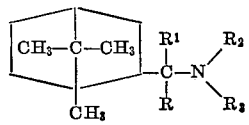

wherein R and R¹ are similar of dissimilar members selected from hydrogen and lower alkyl; R² and R³ are similar or dissimilar members selected from hydrogen, lower alkyl, lower alkenyl, hydroxy substituted lower alkyl, lower alkylamino substituted lower alkyl, di-lower alkylamino substituted lower alkyl, mononuclear aryl and mononuclear lower aralkyl; and the non-toxic, pharmacologically acceptable salts thereof, including the diastereoisomers and endo and exo position isomers of of the said product.

2. The product of claim 1 wherein R is lower alkyl and R¹, R² and R³ are hydrogen.

3. The product of claim 1 wherein R, R¹ and R² are hydrogen and R³ is lower alkyl.

4. The product of claim 1 wherein R and R¹ are lower alkyl and R² and R³ are hydrogen.

5. A compound having the formula:

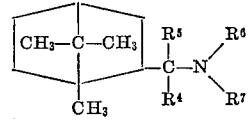

wherein $R^4$, $R^5$, $R^6$ and $R^7$ are similar or dissimilar members selected from hydrogen, methyl and ethyl; and the nontoxic, pharmacologically acceptable acid addition salts thereof, including the diastereoisomers and endo and exo position isomers of the said product.

6. The product of claim 5 wherein $R^4$ is methyl and $R^5$, $R^6$ and $R^7$ are hydrogen.

7. The product of claim 6 in its endo form.

8. The product of claim 5 wherein $R^4$, $R^5$, $R^6$ and $R^7$ are hydrogen.

9. The product of claim 5 wherein $R^4$, $R^5$ and $R^6$ are hydrogen and $R^7$ is methyl.

10. The product of claim 5 wherein $R^4$ and $R^5$ are methyl and $R^6$ and $R^7$ are hydrogen.

11. α-methyl - (L-endo-2-bornane)methylamine hydrochloride.

12. α-Methyl - (L-endo-2-bornane)methylamine hydrochloride, diastereoisomer A.

13. α-methyl - (L-endo-2-bornane)methylamine hydrochloride, diastereoisomer B.

14. 2-bornanemethylamine hydrochloride.

15. α,α - Dimethyl-2-bornanemethylamine hydrochloride.

16. N-methyl-2-bornanemethylamine hydrochloride.

17. N,N - dimethyl-α-methyl-(L-endo - 2 - bornane) methylamine hydrochloride, pentahydrate.

18. N-allyl-α-methyl-2-bornanemethylamine.

References Cited

UNITED STATES PATENTS

| 3,125,569 | 3/1964 | Martin et al. | 260—563 |
| 3,154,580 | 10/1964 | Robinson et al. | 260—563 |
| 3,375,278 | 3/1968 | Snyder | 260—563 X |
| 3,164,601 | 1/1965 | Thesing et al. | |

OTHER REFERENCES

Wagner and Zook: Syn. Org. Chem., 1953, p. 662.

CHARLES B. PARKER, Primary Examiner

CHARLES F. WARREN, Assistant Examiner

U.S. Cl. X.R.

260—501.1, 501.2, 501.21, 544, 557, 558, 561, 566, 570.8, 570.9, 576, 587, 617; 424—316, 325, 329, 330